United States Patent
Terzic et al.

(10) Patent No.: US 11,220,126 B2
(45) Date of Patent: Jan. 11, 2022

(54) TEXTURED PRINTABLE NONWOVEN MEDIA

(71) Applicant: 3M INNOVATIVE PROPERTIES COMPANY, St. Paul, MN (US)

(72) Inventors: Denis Terzic, Minneapolis, MN (US); Ning Zhou, Vadnais Heights, MN (US); Byron E. Trotter, Saint Paul, MN (US)

(73) Assignee: 3M INNOVATIVE PROPERTIES COMPANY, St. Paul, MN (US)

(*) Notice: Subject to any disclaimer, the term of this patent is extended or adjusted under 35 U.S.C. 154(b) by 0 days.

(21) Appl. No.: 16/771,506

(22) PCT Filed: Dec. 14, 2018

(86) PCT No.: PCT/IB2018/060127
§ 371 (c)(1),
(2) Date: Jun. 10, 2020

(87) PCT Pub. No.: WO2019/116347
PCT Pub. Date: Jun. 20, 2019

(65) Prior Publication Data
US 2021/0178798 A1 Jun. 17, 2021

Related U.S. Application Data

(60) Provisional application No. 62/599,128, filed on Dec. 15, 2017.

(51) Int. Cl.
*B41M 5/50* (2006.01)
*B41M 5/52* (2006.01)

(52) U.S. Cl.
CPC .......... *B41M 5/502* (2013.01); *B41M 5/5272* (2013.01); *B32B 2307/30* (2013.01); *B32B 2307/75* (2013.01)

(58) Field of Classification Search
CPC . B41M 5/502; B41M 5/5272; B32B 2307/30; B32B 2307/75
USPC ....................................... 428/32.16
See application file for complete search history.

(56) References Cited

U.S. PATENT DOCUMENTS

| | | |
|---|---|---|
| 5,216,050 A | 6/1993 | Sinclair |
| 5,726,220 A | 3/1998 | Tokushige |
| 5,883,199 A | 3/1999 | McCarthy |
| 6,093,791 A | 7/2000 | Gruber |
| 7,824,030 B2 | 11/2010 | Laney |

(Continued)

FOREIGN PATENT DOCUMENTS

| | | | |
|---|---|---|---|
| CN | 102031073 | 4/2011 | |
| CN | 102031073 A | * 4/2011 | ................ C09J 7/04 |

(Continued)

OTHER PUBLICATIONS

International Search Report for PCT International Application No. PCT/IB2018/060127, dated Apr. 22, 2019, 3 pages.

*Primary Examiner* — Betelhem Shewareged
(74) *Attorney, Agent, or Firm* — Vincent Pham (57) ABSTRACT

A multilayer article including a film layer having a textured first surface and an opposite second surface, wherein the film layer is printable, and a nonwoven material layer bonded to the second surface of the film layer. The film layer may include a semi-crystalline polylactic acid and may be receptive to inkjet printing.

15 Claims, 2 Drawing Sheets

(56) References Cited

U.S. PATENT DOCUMENTS

| | | |
|---|---|---|
| 2003/0216946 A1 | 11/2003 | Ferroro |
| 2007/0255013 A1 | 11/2007 | Becraft |
| 2008/0038976 A1 | 2/2008 | Berrigan |
| 2011/0217523 A1 | 9/2011 | Huang |
| 2012/0211918 A1 | 8/2012 | Ausen |
| 2013/0164471 A1 | 6/2013 | Suzuki |
| 2016/0243869 A1* | 8/2016 | Nagoshi .................. D21H 21/52 |
| 2019/0185662 A1* | 6/2019 | Zhou ........................ B32B 27/36 |
| 2021/0178798 A1* | 6/2021 | Terzic ...................... B32B 37/06 |

FOREIGN PATENT DOCUMENTS

| | | |
|---|---|---|
| EP | 0587069 | 3/1994 |
| EP | 2302134 | 3/2011 |
| WO | WO 2007-084291 | 7/2007 |
| WO | WO 2014-176509 | 10/2014 |
| WO | WO 2017-222824 | 12/2017 |
| WO | WO 2017-222863 | 12/2017 |

* cited by examiner

TEXTURED PRINTABLE NONWOVEN MEDIA

TECHNICAL FIELD

The present invention relates to graphic media, and more particularly to textured, printable graphic media.

BACKGROUND

Remodeling of workplaces or living spaces often involves modifying the appearance of vertical surfaces, such as walls and doors. One manner of modifying these surfaces involves painting or otherwise coating one or more layers of paint or another material onto existing surfaces to achieve an updated appearance. When a different or more specialized visual effect is desired, however, it is common to apply wallcovering materials such as wallpaper having patterns, designs, and/or colors that would not be achievable by paint alone.

In some cases, the surfaces to be covered include blemishes or other surface imperfections that are visually detectable and therefore detract from the wall appearance even after the application of paint or wallpaper. In such situations, it may be advisable to perform substantial repairs or rework of the surfaces to provide a more blemish-free surface prior to the application of paint or wallpaper. Such preliminary work can be time consuming and expensive.

Thus, while currently available materials can be acceptable for many wallcovering applications, there is a desire to provide surface coverings having additional options for visual appearance that may also be adaptable to disguise certain surface imperfections. In addition, there is a desire to use wallcoverings that simulate the look of more expensive materials in order to provide upscale appearances at a lower cost to the consumer.

SUMMARY

With the improvements in available printing technologies, the digital graphics market space is experiencing a resurgence in the use of wallcoverings and particularly digitally printable wallcoverings. The use of relatively thin graphic films for wall applications, particularly those with more complicated visual patterns, may require specialized installation, and roughness or imperfections in a wall surface may remain visible due to the caliper and conformability of the graphic film. A thicker media can be more useful in hiding imperfections present on the wall surface, and installation of a thicker media generally requires less skill and can be performed by a larger labor pool.

In accordance with embodiments described herein, relatively thick textured media can provide upscale appearances that mimic more expensive wall finishes such as textiles, stone, wood grain, and leather. A direct print media further allows customizable graphic solutions for the end-user. Thicker and heavier nonwoven media may further provide protective, insulating, and acoustic properties that are otherwise unavailable with stand-alone film graphics. Such textured nonwoven media may also be used to fill gaps in soft-signage that film-based solutions cannot.

While much of the film-based commercial graphics industry now utilizes or is moving toward wide-format digital inkjet printers, a large portion of the polyester textile and fabric print industry utilizes specialized dye-sublimation printing for the upscale, premium appearance provided by these substrates. The textured, printable nonwoven materials of embodiments described herein provide a solution and entryway into this market for the digital inkjet graphic manufacturer. An inkjet printable textile-like media fits into the existing direct-print infrastructure and offers a less expensive entry point than traditional textiles. Manufacturers can thus create additional value to their own base of existing graphic customers.

Unlike traditional PVC and polyester print substrates, aspects of the multilayer articles presented herein utilize renewable polylactic acid polymer (PLA) obtained from natural biomass material, which is additionally compostable. PLA compositions may exhibit similar physical properties to PVC without significant increase in cost to the end-user while providing for improved sustainability of the material.

In certain embodiments, a multilayer article includes a film layer having a textured first surface and an opposite second surface, wherein the film layer is printable. The multilayer article further includes a nonwoven material layer bonded to the second surface of the film layer. The film layer of the article can comprise a semi-crystalline polylactic acid, and this film layer can be receptive to inkjet printing, such as at least one of solvent inkjet printing, latex inkjet printing, UV inkjet printing, and screen printing. The film layer further may comprise at least one of an amorphous polylactic acid, a plasticizer, and a nucleating agent, and may further comprise a second polymer having a Tg of at least 25° C. The nonwoven material layer of the multilayer article may comprise a polylactic acid, and the film layer may be thermally bonded to the nonwoven material layer.

In certain embodiments of the multilayer article, at least one of the film layer and the nonwoven material layer comprises particles for surface matting, flame retardant materials, hydrolysis-inhibiting additives, and/or antimicrobials. The multilayer article may also include a pressure sensitive adhesive layer bonded to an outer surface of the nonwoven material layer.

In accordance with embodiments of the multilayer article, the second surface of the film layer comprises a textured or contoured surface, wherein the nonwoven material layer comprises a top surface that is textured or contoured to mate with the textured or contoured second surface of the film layer. The nonwoven material may further comprise a textured outer surface opposite the top surface, and the textured first surface of the film layer may comprise a surface pattern that is different from a surface pattern of the second surface of the film layer and/or a surface pattern of the textured top surface of the nonwoven material layer. At least one of the film layer and the nonwoven material layer may comprise multiple sublayers.

Further described herein is a method of making a multilayer article comprising the steps of bonding a film layer to a nonwoven material layer, wherein the film layer comprises a first surface and an opposite second surface, and wherein at least one of the film layer and the nonwoven material layer comprises a polylactic acid, texturing a first surface of the film layer, and imaging the film layer. The imaging step may comprise inkjet printing of graphics on the film layer. The method may further include steps of calendaring the nonwoven material layer and/or attaching a pressure sensitive adhesive layer to an outer surface of the nonwoven material layer. The bonding step may comprise extruding the film layer onto the nonwoven material layer.

BRIEF DESCRIPTION OF THE DRAWINGS

The present invention will be further explained with reference to the appended Figures, wherein.

DETAILED DESCRIPTION

Figure 1:
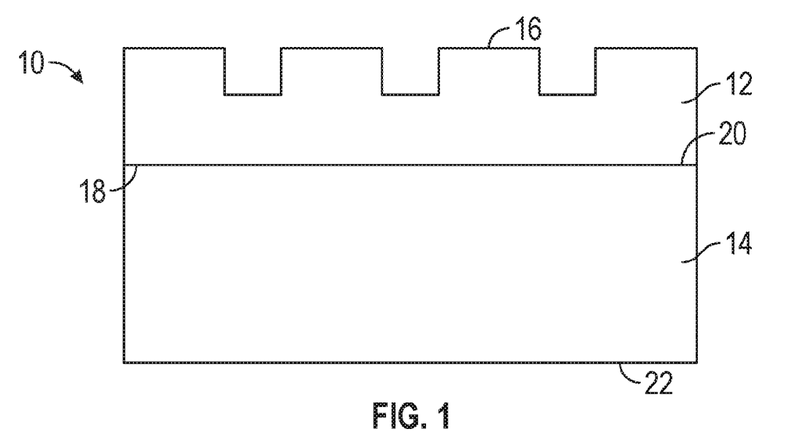
FIG. 1 is a cross-sectional side view of an embodiment of a multilayer article.

Referring now to the Figures, and initially to FIG. 1, a multilayer article 10 is illustrated, which generally includes a film layer 12 that is thermally bonded to a nonwoven material layer 14. Film layer 12 includes a first or top surface 16 and a second or bottom surface 18. Nonwoven material layer 14 includes a first or top surface 20 adjacent to the bottom surface 18 of film layer 12 and a second or bottom surface 22. Embodiments described can be used for interior decorative applications such as wall covering, retail soft signage, banners, and the like, and provide enhanced aesthetic properties that are not typical for traditional graphic films.

Film layer 12 is a film material that is optimized for printability with digital inkjet platforms (e.g., solvent, eco, latex, UV, or other method of image production). As shown, top surface 16 of film layer 12 is textured, wherein the "toothed" pattern is provided for illustration purposes only. The actual texturing of this top surface 16 can include a wide variety of regular or irregular patterns, which may repeat in regular or irregular intervals across the surface of the film layer 12. Exemplary surface textures include textiles, stone, wood grain, and leather.

Film layer 12 is a polylactic acid or PLA-based film, such as the PLA-based graphic films provided in PCT/US2017/036686, which comprise a semicrystalline polylactic acid polymer, a second polymer such as polyvinyl acetate polymer having a glass transition temperature (Tg) of at least 25° C., and plasticizer, and the PLA films provided in PCT/US2017/037121, which comprise a thermoplastic aliphatic polyester, a polyvinyl alkanoate polymer having a Tg of no greater than 70° C.; and a non-lactide plasticizer having an acid number of no greater than 10 and having an average molecular weight of no greater than 5000 g/mol, both of which are commonly owned by the assignee of the subject application and are incorporated herein by reference in their entireties. The film layer further may comprise at least one of an amorphous polylactic acid, a plasticizer, and a nucleating agent, and may further comprise a second polymer having a Tg of at least 25° C.

Embodiments of the nonwoven material layer 14 include a thermally bonded PLA-based nonwoven material that is spunbond, melt-blown, or a combination of spunbond and meltblown. Multiple layers may be thermally combined (e.g., spunbond/melt-blown/spunbond) with optional varying fiber size diameters for increased optical hiding power, mechanical strength, and/or other desired properties. The nonwoven material of embodiments of the invention will have a weight in the range of approximately 48-200 gsm, although higher or lower weights are contemplated. The nonwoven material layer 14 is provided in a web configuration, such as can be prepared using the equipment and processing techniques for spunbond nonwoven webs described in U.S. Pat. Pub. No. 2008/0038976A1 (Berrigan et al.). In an exemplary procedure, materials are dry blended together and then fed from a hopper into a single screw extruder. The molten resin is then pumped into a spin pack having rows of small orifices. Fibers are formed through the spin pack and subsequently cooled down by passing them through a quenching air chamber. The PLA fibers can then be collected as an unbonded fiber mat on a conventional screen support, and the fiber mat is then passed through a through-air bonder. Subsequently in a separate step, the PLA spunbond nonwovens can be thermally bonded by passing through the nip of a pair of heated calendar rollers to provide either a smooth or patterned surface. That is, the calendar rollers can be smooth, patterned, or a combination of smooth and patterned, wherein the embodiment illustrated in FIG. 1 provides for a smooth calendared surface for the top surface 20 of the nonwoven material layer 14. However, the nonwoven material layer 14 can instead be produced using different techniques and different materials in order to achieve desired properties and surface finishes for the layer.

The nonwoven web may be calendared with various patterns (dots, squares, lines of varying size and pitch) to provide mechanical integrity and alter the final appearance of the construction. The calendared patterns may additionally transfer to the subsequent extruded top PLA film layer, as described below. More than one pattern may be imparted to the nonwoven material, such as large, low density dots for mechanical strength followed by small linear patterns for visual aesthetics.

The nonwoven material layer 14 is provided with a thickness that provides desired properties for the multilayer article 10, such as a desired flexibility for the overall material. The thickness of nonwoven layer 14 can further be selected for ease of installation and its ability to hide defects of the wall or other surface to which it will be applied. The thickness can further be selected to provide a dimensionally stable material that has little to no shrinkage when applied to a surface.

In certain embodiments, the nonwoven material layer is selected from a melt-blown web, a spun-bond web, a spun-laced web, a wet-laid web, a dry-laid web, an electro-spun web, a hydroentangled web, and a combination thereof (e.g., spun-bond/melt-blown/spun-bond combinations, spun-bond/melt-blown/melt-blown/spun-bond combinations, spun-bond/melt-blown/spun-bond/melt-blown/spun-bond combinations, and spun-bond/melt-blown/melt-blown/melt-blown/spun-bond combinations).

The nonwoven material layer of the multilayer articles provided herein may include fibers that are made from one or more polymers, including natural polymer fibers, synthetic polymer fibers, or combinations thereof. The synthetic fibers may include a synthetic thermoplastic polymer selected from an aliphatic polyester, an aromatic polyester, a polyamide, or combinations thereof.

In the manufacturing of multilayer articles provided herein, the PLA-based film layer 12 is extruded onto the nonwoven material layer 14. A finishing roll or textured release paper laminated into the nip can then be used to provide embossing and texturing to the surface of the film layer 12. Printing or imaging of the film layer 12 can occur prior to, during, and/or subsequent to the texturing process, as desired. The texturing and imaging can optionally be designed such that the graphics match a pattern used for the textured surface. As an example, when a wood grain pattern is imaged onto the film layer 12, the corresponding texture may match the grain pattern in order to provide authenticity to the appearance of the multilayer article 10.

The extruded PLA film layers provided herein may be textured via textured release papers, embossed with patterned rolls, thermoformed, or textured using other methods. The textures may be designed with specific functions such as geometries that hinder dirt or moisture collection, hide scuff marks, and/or aid in directing or dampening acoustic noise. The PLA film construction may be single or dual layer with specific functions for each layer or the combination of layers, such as constructions of an inner layer that is highly embossable for macro-size patterns and/or that offers chemical resistance or durability, which may be followed by a layer with exemplary printability and micro-textures for appearance.

Figure 2:
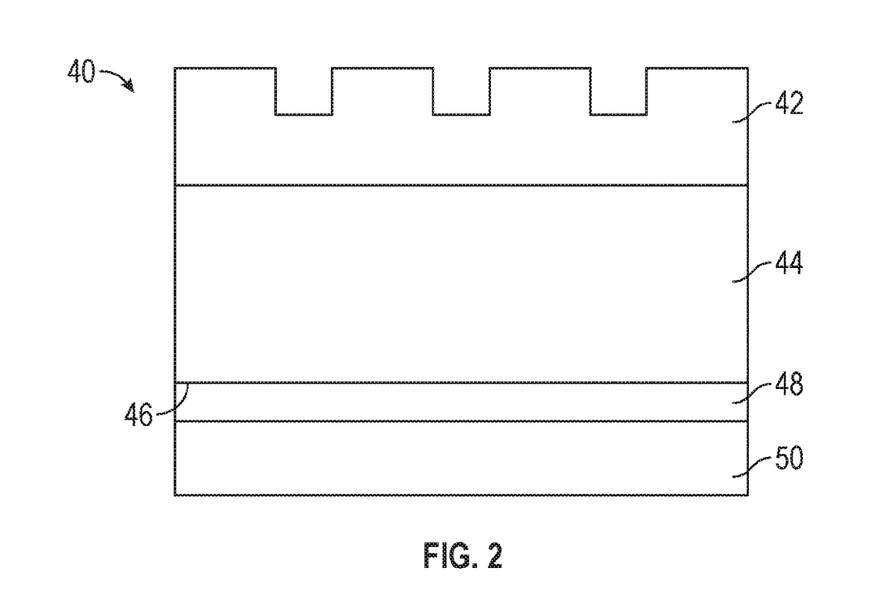
FIG. 2 is a cross-sectional side view of an embodiment of a multilayer article.

FIG. 2 illustrates an embodiment of a multilayer article 40 that generally includes a film layer 42 that is thermally bonded to a nonwoven material layer 44 that has a bottom surface 46, wherein the properties discussed herein relative to article 10 are applicable also to article 40. Article 40 further includes an adhesive layer 50 that can be useful for attaching the multilayer article 40 to a desired surface, such as a wall. The adhesive layer 50 may be applied directly to the bottom surface 46 of the nonwoven layer 44 or an optional primer/tie layer 48 may be positioned between the nonwoven layer 44 and the adhesive layer 50. The adhesive layer 50 may include a number of materials or combinations of materials, including pressure sensitive adhesives, films having a network of microstructure air channels in the adhesive that allow air to escape laterally beneath the film (e.g., films available under the trade designation "Comply", commercially available from the 3M Company of St. Paul, Minn.), and/or material commercially available from the 3M Company of St. Paul, Minn. under the trade designation "Controltac" that minimizes the initial contact area of adhesive and allows an applicator to reposition the film during application. A release liner (not shown) can optionally be positioned adjacent to the adhesive layer 50, which is generally a protective film or paper layer that covers the adhesive layer until it is desired to expose the adhesive and apply the article 40 to a substrate.

Figure 3:
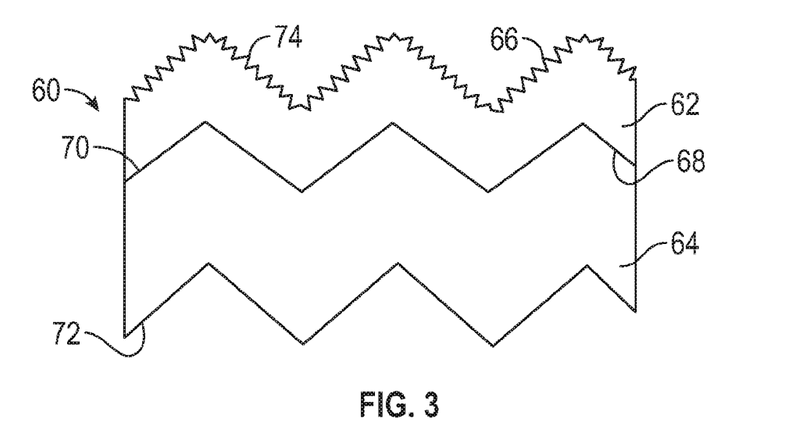
FIG. 3 is a cross-sectional side view of an embodiment of a multilayer article.

An embodiment of a multilayer article 60 is illustrated in FIG. 3, which generally includes a film layer 62 that is thermally bonded to a nonwoven material layer 64. Film layer 62 includes a first or top surface 66 and a second or bottom surface 68. Nonwoven material layer 64 includes a first or top surface 70 adjacent to the bottom surface 68 of film layer 62 and a second or bottom surface 72.

Nonwoven layer 64 is calendared or otherwise formed to provide a patterned or contoured layer. Although this figure shows this contouring to be a zigzag surface, many other contours are contemplated, including regular and irregular patterns of angles, curves, and other shaping of the layer.

Figure 5:
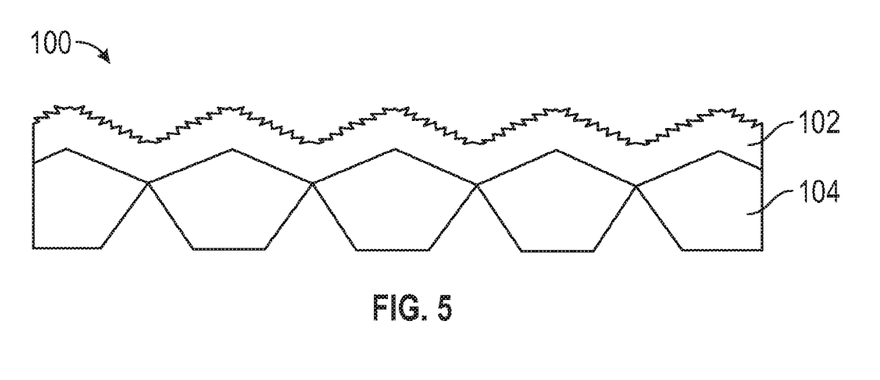
FIG. 5 is a cross-sectional side view of an embodiment of a multilayer article.

Top surface 66 of film layer 62 is textured with a surface texture 74, such as is described herein relative to texturing of a PLA-based film layer. Film layer 62 is further textured or contoured, rather than a flat or planar material layer as illustrated in FIGS. 1 and 2, for example. That is, the surface texture 74 of the film layer 62 is independent of the calendar pattern or contour of the corresponding nonwoven layer 64. As shown, because the film layer 62 is contoured, the bottom surface 68 is also contoured and generally matches the shape of the top surface contours. In an embodiment, the contours of the film layer 62 can generally match the contours of the nonwoven layer 64 onto which it is extruded. However, in another embodiment illustrated in FIG. 5, a multilayer article 100 includes a nonwoven material layer 104 with a relatively deep calendar pattern that includes a different contour on its bottom surface than its top surface, with a film layer 102 that is extruded to generally match the pattern of the top of the nonwoven layer 104.

Figure 4:
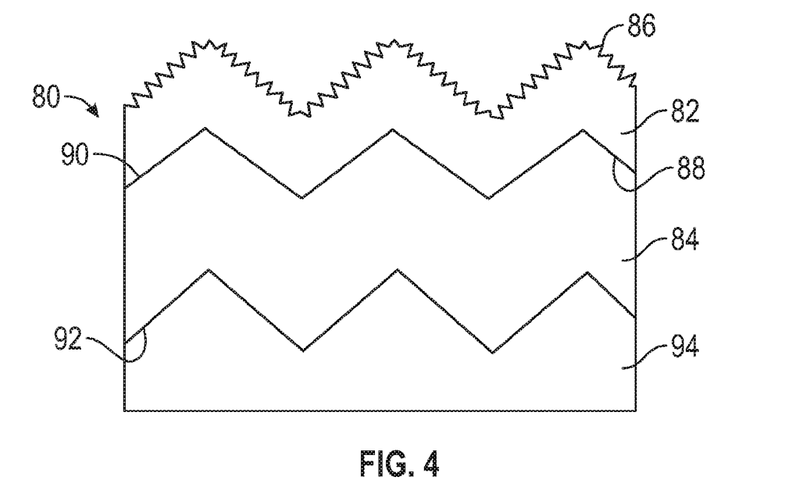
FIG. 4 is a cross-sectional side view of an embodiment of a multilayer article.

FIG. 4 illustrates an embodiment of a multilayer article 80 that generally includes a film layer 82 that is thermally bonded to a nonwoven material layer 84. Film layer 82 includes a first or top surface 86 and a second or bottom surface 88. Nonwoven material layer 84 includes a first or top surface 90 adjacent to the bottom surface 88 of film layer 82 and a second or bottom surface 92, wherein the contours and properties discussed herein relative to article 60 are applicable also to article 80. Article 80 further includes an adhesive layer 94 that can be useful for attaching the multilayer article 80 to a desired surface, such as a wall. The adhesive layer 94 may be applied directly to the bottom surface 92 of the nonwoven layer 84 or an optional primer/tie layer (not shown) may be positioned between the nonwoven layer 84 and the adhesive layer 94. The adhesive layer 94 may include a number of materials or combinations of materials, including pressure sensitive adhesives, films having a network of microstructure air channels in the adhesive that allow air to escape laterally beneath the film (e.g., films available under the trade designation "Comply", commercially available from the 3M Company of St. Paul, Minn.), and/or material commercially available from the 3M Company of St. Paul, Minn. under the trade designation "Controltac" that minimizes the initial contact area of adhesive and allows an applicator to reposition the film during application. Again, the article 80 can optionally further include a release liner adjacent to the adhesive layer 94.

Nonwoven or film layers described herein optionally contain additives such as particles for surface matting (i.e., to provide a matte surface appearance), flame retardant materials to meet indoor flammability requirements, hydrolysis-inhibiting additives for extended lifetime, and/or antimicrobials to prevent mold. The present construction, which utilizes at least one layer that is a PLA-based layer, is compostable and provides a sustainable graphic solution for customers. The visual appearance and service life of the entire construction of any of the multilayer articles provided herein may additionally be altered by use of overlaminates.

It is noted that while the description herein of the multilayer article embodiments may be used as wallcoverings, the multilayer articles are may also be provided for use on horizontal surfaces, such as counter tops, shelving, or flooring, for example. Further, while the surfaces to which the multilayer article embodiments are secured may be flat or planar, it is understood that the surfaces may instead be curved, angled, or otherwise differently configured than a flat or planar surface.

Examples

Objects and advantages of this invention are further illustrated by the following examples, but the particular materials and amounts thereof recited in these examples, as well as other conditions and details, should not be construed to unduly limit this invention. These examples are merely for illustrative purposes and are not meant to limit the scope of the appended claims. Unless otherwise noted, amounts of material are listed by weight, or by weight percent ("wt. %").

TABLE 1

Materials

| Material | Description/Use | Source |
|---|---|---|
| INGEO 4032D | Semicrystalline polylactic acid (PLA) (2 wt.% D-lactide; films grade) | NatureWorks, LLC, Minnetonka, MN |
| INGEO 4060D | Amorphous polylactic acid (PLA) (10 wt.% D-lactide; films grade) | NatureWorks, LLC, Minnetonka, MN |
| INGEO 6202D | Semicrystalline polylactic acid (PLA) (2 wt.% D-lactide; fibers & nonwovens grade) | NatureWorks, LLC, Minnetonka, MN |
| VINAVIL K70 | Polyvinyl acetate (Tg = 42° C.; weight average molecular weight ≈ 580,000 g/mol), | Vinavil, Italy |
| CITROFLEX A4 | Acetyl tributyl citrate, a plasticizer | Vertellus Performance Materials, Bayonne, NJ, USA |
| ECOPROMOTE | Zinc phenylphosphonate, a nucleation agent | Nissan Chemical Industrials (Japan) |
| CLARIANT PLA4032_TiO2 | 50 wt. % Titanium dioxide in 50 wt. % semicrystalline Ingeo PLA 4032D masterbatch | Clariant Corporation, Minneapolis, MN |
| CLARIANT PLA6202_TiO2 | Titanium dioxide in Ingeo PLA 6202D masterbatch | Clariant Corporation, Minneapolis, MN |
| SUKANO PLA CC S513 | Titanium dioxide in a semicrystalline Ingeo PLA masterbatch, | Sukano AG (US) |

TABLE 2

Textured Release Paper Materials

| Material | Use | Supplier |
|---|---|---|
| 7190 ULTRACAST Universal Mokka F | Matte textured release paper | Sappi North America, Westbrook, ME. |
| 7171 ULTRACAST Universal Reno | Leather textured release paper | Sappi North America, Westbrook, ME. |
| MELINEX 437 Polyester Film, 200 Gauge | Non-textured (smooth) samples | Dupont Teijin Films, Chester, VA. |

TABLE 3

Composition of PLA Nonwoven

| Components | Composition (wt. %) |
|---|---|
| INGEO 6202 PLA | 99.0 |
| CLARIANT PLA6202_TiO2 | 1.0 |

Preparation of Nonwoven Web or Nonwoven Material Layer

PLA spunbond nonwoven webs were prepared on an experimental spunbond line using the equipment and processing techniques for spunbond nonwoven webs described in U.S. Pat. Pub. No. 2008/0038976A1 (Berrigan et al.). In a typical procedure, 99 wt. % INGEO PLA 6202D and 1 wt. % CLARIANT PLA6202 TiO2 masterbatch were dry blended together and then fed from a hopper into a 2 inch (5.1 cm) single screw extruder. The extruder temperature was 230° C. The molten resin was pumped via a gear pump into a spin pack having rows of small orifices. Fibers were formed through the spin pack and subsequently cooled down by passing them through a quenching air chamber. The rate and extent of fiber attenuation was controlled by the attenuating pressure (AP) of the attenuator air. The attenuated PLA fibers were collected as an unbonded fiber mat on a conventional screen support using vacuum assistance, and the fiber mat was then passed through a through-air bonder.

Subsequently in a separate step, the PLA spunbond nonwovens were thermally bonded or calendared by passing through the nip of a pair of heated calendar rollers, of which the bottom roller had smooth surface and the top roller had either a smooth surface or circular bonding pattern covering approximately 18% of the surface area.

Preparation of Pre-Compounded PLA Resins of Printable Film Layers

A twin screw extruder (Zone 1: 250° F. (121° C.); Zones 2 and 3: 390° F. (199° C.); Zones 4 and 5: 350° F. (177° C.)) and underwater pelletizer were used to prepare pre-compounded and free-flowing PLA pellets A and B, which had the following compositions:

TABLE 4

Composition of Pre-compounded PLA Resin A

| Components | Composition (wt. %) |
|---|---|
| INGEO PLA 4060 | 38 |
| INGEO PLA 4032 | 1.2 |
| SUKANO PLA CC S513 | 20 |
| VINAVIL K70 PVAc | 22.5 |
| CITROFLEX A4 Plasticizer | 18 |
| ECOPROMOTE Nucleating Agent | 0.3 |

TABLE 5

Composition of Pre-compounded PLA Resin B

| Components | Composition (wt. %) |
|---|---|
| INGEO PLA 4060 | 36 |
| INGEO PLA 4032 | 1.2 |
| CLARIANT PLA4032 TIO2 | 20 |
| VINAVIL K70 PVAc | 22.5 |
| CITROFLEX A4 Plasticizer | 20 |
| ECOPROMOTE Nucleating Agent | 0.3 |

TABLE 6

DSC results of Pre-compounded PLA Resins A and B

| Pre-compounded PLA Resin | $T_g$ (° C.) | $T_m$ (° C.) | $\Delta H_m$ (J/g) |
|---|---|---|---|
| A | 4 | 144 | 6.4 |
| B | −2 | 155 | 7.7 |

Preparation of Textured Print Layer by Extrusion Coating onto Nonwoven

The pre-compounded PLA pellets A or B were fed to a single screw extruder (Gloucester Engineering extruder, Gloucester, Mass.) having a 2 inch (~5.1 cm) diameter screw and a length of 78 inch (1.98 cm). The extruder was operated at a speed of approximately 10 rpm, with a cooled feed throat, and the following approximate zone and die temperatures: Z1: 66° C. (150° F.); Z2: 166° C. (330° F.); Z3: 177° C. (350° F.); Z4: 177° C. (350° F.); Z5: 179° C. (355° F.), and die: 193° C. (380° F.). The polymer melt was extrusion coated onto an approximate 20 inch (76.2 cm) wide PLA nonwoven material layer through a slot die to form a thin film with various thicknesses. There were various ways used to impart a textured surface to the printable PLA film layer at the time of the extrusion coating process:

1) Upon contact to the PLA nonwovens, the polymer melt was nipped under pressure by a heated rubber roll to impart a surface texture to the film layer replicating the unadulterated rubber roll surface to provide a look termed here as "Matte Plaster".
2) Upon contact to the PLA nonwovens, the polymer melt was nipped under pressure by a chilled steel embossing roll comprising a uniformly repeating 400 micron pitch surface pattern of 100 micron raised circular features to impart a low gloss, non-reflective surface texture to the film layer termed here as "Ultramatte".
3) Upon contact to the PLA nonwovens, the polymer melt was nipped under pressure by a chilled steel embossing roll with a surface comprising a pattern mimicking the appearance of a twill textile weave. Raised rectangular 2×4 millimeter features each comprised of nine lengthwise 200 micron wide features were arranged in a standard 2/2 twill weave pattern. This roll was used to impart a surface texture referred to herein as "Carbon Fiber."
4) Upon contact with the PLA nonwovens, the polymer melt was laminated with textured release papers or clear polyester film at the nip under pressure to impart various surface textures to the film layer.

Examples 1-2: Examples 1-2 were prepared by extrusion coating pre-compounded PLA resin A onto a 48 gsm nonwoven web calendared with an 18% bonding pattern roll. The line speed was adjusted such that the extrusion coating thicknesses for Examples 1 and 2 were 1 and 0.7 mils, respectively. A chilled steel embossing roll with the Ultramatte pattern was used to impart a surface texture to the extrusion coated film.

Example 3: Example 3 was prepared in a similar fashion to Examples 1-2. Pre-compounded PLA resin B was extrusion coated onto a 100 gsm nonwoven web with a smooth roll calendar. The Matte Plaster surface texture was achieved with the use of a heated rubber roll.

Example 4: Example 4 was prepared in a similar fashion to Example 3, except that a heated steel embossing roll with a surface pattern replicating the appearance of a 2/2 twill Carbon Fiber weave was used to impart the surface texture to the extrusion coated film.

Examples 5-7: Examples 5-7 were prepared in a similar fashion to Examples 3-4, except that a 50 gsm nonwoven web with a smooth calendar was used. Textured release papers (obtained from Sappi North America, Westbrook, Me.) were laminated into the nip during extrusion coating to impart the surface texture when preparing Examples 5 and 6. A clear polyester film (obtained from Dupont Teijin Films, Chester, Va.) was used instead for Example 7 to provide a smooth, non-textured surface.

Example 8: Example 8 was prepared by extrusion coating pre-compounded PLA resin B onto polyester film. No texture was imparted to the surface.

TABLE 7

| | Examples | | | | |
|---|---|---|---|---|---|
| Ex. | Nonwoven (gsm) | Nonwoven Calendar | Printable PLA Resin | Printable Film Layer Thickness | Surface Texture/ Method |
| Example 1 | 48 | 18% bonded area | A | 1 mil | Ultramatte |
| Example 2 | 48 | 18% bonded area | A | 0.7 mil | Ultramatte |
| Example 3 | 100 | Smooth | B | 1 mil | Matte Plaster |
| Example 4 | 100 | Smooth | B | 1 mil | Carbon Fiber |
| Example 5 | 50 | Smooth | B | 1 mil | Matte |
| Example 6 | 50 | Smooth | B | 1 mil | Leather |
| Example 7 | 50 | Smooth | B | 1 mil | Non-textured |
| Example 8 | None | — | B | 1 mil | Non-textured |

Test Methods

DSC—Differential Scanning Calorimetry

The glass transition temperature ($T_g$), melting temperature ($T_m$) and melting endotherm ($\Delta H_m$) of each sample was measured using a differential scanning calorimetry equipment (TA Instruments, New Castle, Del.) according to ASTM D3418-12. Each sample (5~10 mg) was heated from −60° C. to 200° C. at 10° C./min. Various parameters were derived from the DSC as defined as follows:

$T_g$—refers to the midpoint temperature of the heating scan, described as $T_{mg}$ in ASTM D3418-12.

$T_m$—refer to the melting peak temperature of the heating scan, described as $T_{pm}$ in ASTM D3418-12.

$\Delta H_m$—refer to the melting endotherm mass normalized enthalpy of the heating scan, as described in section 11 of ASTM D3418-12. Results are shown in Table 6.

Printing Performance Analysis

Printability was evaluated using an absolute print density test method according to ASTM D7305-08a: "Standard Test Method for Reflection Density of Printed Matter" and an X-RITE (Grand Rapids, Mich.) 500 Series spectrodensitometer having a 5 mm aperture on the measuring head. The spectral response was calibrated using a calibration plaque. The printable, textured surface of the media was printed with primary color bars covering at least 12 in$^2$ (77.4 cm$^2$) using the following printers:

SURECOLOR S80600 printer (obtained from Epson America, Inc., Long Beach, Calif.) with Epson ULTRACHROME GS3 solvent ink.

HP LATEX 560 printer (obtained from The Hewlett-Packard Company, Palo Alto, Calif.) with HP Latex ink.

After printing, the samples were air dried for a minimum of 24 hours prior to measuring the print density of the color bars.

The ink color density of the Example construction is compared to the ink color density of Control Examples (See Tables 8 and 9) by dividing the print density of the Example by the print density of the Control and expressing the result as a percentage of standard performance. Achievements of 100% indicate equal color saturation. Values higher than 100% represent higher color saturation and values below 100% represent less saturation. Total color density is the summation of the measurements for cyan, magenta, yellow, and black.

Shrinkage Performance Analysis

Shrinkage was evaluated according to ASTM D1204-14: "Standard Test Method for Linear Dimensional Changes of Nonrigid Thermoplastic Sheeting or Film at Elevated Temperature". Samples oriented machine direction (MD) and cross direction (CD) were stamped out with precision 10 inch (25.4 cm) dies. Samples were laid horizontally on paper or clipped to hangers to allow free movement during exposure. Samples were placed into ovens at 50° C. and 65° C. for the designated exposure period after which measurements were made to calculate shrinkage. The following equation was used to calculate the linear dimensional change:

$$\text{Linear dimensional change } (\%) = 100 \times \left(\frac{L_f - L_o}{L_o}\right)$$

where:
$L_f$=final length of sample measured in inches after exposure
$L_o$=initial length of sample measured in inches before exposure Data/Results

TABLE 8

Print Density SURECOLOR S80600 printer with Epson ULTRACHROME GS3 solvent ink

| Ex. | Cyan | Magenta | Yellow | Black | Total | Total % of Control 1 | Total % of Control 2 | Total % of Control 3 | Total % of Control 4 |
|---|---|---|---|---|---|---|---|---|---|
| Control 1 DREAMSCAPE Textured Wall Wrap Classic (Roysons Corp., Rockaway, NJ) | 1.71 | 1.47 | 1.16 | 1.80 | 6.14 | — | 126% | 87% | 87% |
| Control 2 PHOTO TEX Original Wallpaper Fabric-Solvent (Photo Tex Group, Inc. Boardman, OH) | 1.41 | 1.18 | 0.92 | 1.38 | 4.89 | 80% | — | 70% | 69% |
| Control 3 3M CONTROLTAC PVC film U180Cv3 (3M, St. Paul, MN, | 1.93 | 1.61 | 1.22 | 2.27 | 7.03 | 115% | 144% | — | 100% |
| Control 4 3M ENVISON non-PVC film SV480Cv3 (3M, St. Paul, MN) | 2.00 | 1.55 | 1.21 | 2.30 | 7.05 | 115% | 144% | 100% | — |
| Example 1 | 1.31 | 1.07 | 1.00 | 1.42 | 4.80 | 78% | 98% | 68% | 68% |
| Example 2 | 1.09 | 0.97 | 0.95 | 1.28 | 4.29 | 70% | 88% | 61% | 61% |
| Example 3 | 1.55 | 1.31 | 1.14 | 1.69 | 5.68 | 93% | 116% | 81% | 81% |
| Example 4 | 1.32 | 1.10 | 0.99 | 1.66 | 5.08 | 83% | 104% | 72% | 72% |
| Example 5 | 0.68 | 0.62 | 0.65 | 0.74 | 2.69 | 44% | 55% | 38% | 38% |
| Example 6 | 0.91 | 0.80 | 0.80 | 0.93 | 3.44 | 56% | 70% | 49% | 49% |
| Example 7 | 1.66 | 1.42 | 1.16 | 2.07 | 6.31 | 103% | 129% | 90% | 89% |

TABLE 9

Print Density HP LATEX 560 printer with HP Latex ink

| Ex. | Cyan | Magenta | Yellow | Black | Total | Total % of Control 1 | Total % of Control 2 | Total % of Control 3 | Total % of Control 4 |
|---|---|---|---|---|---|---|---|---|---|
| Control 1 DREAMSCAPE Textured Wall Wrap Classic (Roysons Corp., Rockaway, NJ) | 1.76 | 1.63 | 1.07 | 1.82 | 6.28 | — | 144% | 91% | 137% |
| Control 2 PHOTO TEX Original Wallpaper Fabric-Solvent (Photo Tex Group, Inc. Boardman, OH) | 1.19 | 1.10 | 0.86 | 1.20 | 4.35 | 69% | — | 63% | 95% |

TABLE 9-continued

Print Density HP LATEX 560 printer with HP Latex ink

| Ex. | Cyan | Magenta | Yellow | Black | Total | Total % of Control 1 | Total % of Control 2 | Total % of Control 3 | Total % of Control 4 |
|---|---|---|---|---|---|---|---|---|---|
| Control 3 3M CONTROLTAC PVC film U180Cv3 (3M, St. Paul, MN, | 1.95 | 1.78 | 1.09 | 2.05 | 6.87 | 109% | 158% | — | 150% |
| Control 4 3M ENVISON non-PVC film SV480Cv3 (3M, St. Paul, MN) | 1.32 | 1.21 | 0.91 | 1.14 | 4.58 | 73% | 105% | 67% | — |
| Example 1 | 1.07 | 1.09 | 0.80 | 1.45 | 4.40 | 70% | 101% | 64% | 96% |
| Example 2 | 1.08 | 1.03 | 0.79 | 1.35 | 4.26 | 68% | 98% | 62% | 93% |
| Example 3 | 1.75 | 1.64 | 1.04 | 1.89 | 6.31 | 100% | 145% | 92% | 138% |
| Example 4 | 1.44 | 1.49 | 1.01 | 1.67 | 5.61 | 89% | 129% | 82% | 122% |
| Example 5 | 1.20 | 1.07 | 0.84 | 1.20 | 4.31 | 69% | 99% | 63% | 94% |
| Example 6 | 1.33 | 1.25 | 0.91 | 1.42 | 4.91 | 78% | 113% | 71% | 107% |
| Example 7 | 1.86 | 1.74 | 1.08 | 2.03 | 6.72 | 107% | 154% | 98% | 147% |

TABLE 10

Shrinkage

| Ex. | 50° C. for 24 hr MD (% shrinkage) | 50° C. for 24 hr CD (% shrinkage) | 65° C. for 24 hr MD (% shrinkage) | 65° C. for 24 hr CD (% shrinkage) |
|---|---|---|---|---|
| 2 mil PVC film coat IJ180 (3M, St. Paul, MN) | −1.6 | −2.0 | −1.9 | −2.0 |
| Example 1 | −0.5 | 0.0 | −1.9 | −0.5 |
| Example 3 | −0.8 | 0.0 | −0.7 | 0.0 |
| Example 4 | −0.8 | 0.0 | −0.9 | 0.0 |
| Example 8 | −1.4 | −0.8 | −2.2 | −0.8 |

The present invention has now been described with reference to several embodiments thereof. The entire disclosure of any patent or patent application identified herein is hereby incorporated by reference. The foregoing detailed description and examples have been given for clarity of understanding only. No unnecessary limitations are to be understood therefrom. It will be apparent to those skilled in the art that many changes can be made in the embodiments described without departing from the scope of the invention. Thus, the scope of the present invention should not be limited to the structures described herein, but only by the structures described by the language of the claims and the equivalents of those structures.

What is claimed is:

1. A multilayer article comprising:
   a film layer comprising a textured first surface and an opposite second surface, wherein the film layer is printable; and
   a nonwoven material layer bonded to the second surface of the film layer.

2. The multilayer article of claim 1, wherein the film layer comprises a semi- crystalline polylactic acid.

3. The multilayer article of claim 2, wherein the film layer is receptive to inkjet printing.

4. The multilayer article of claim 3, wherein the inkjet printing comprises at least one of solvent inkjet printing, latex inkjet printing, UV inkjet printing, and screen printing.

5. The multilayer article of claim 1, wherein the film layer further comprises at least one of an amorphous polylactic acid, a plasticizer, and a nucleating agent.

6. The multilayer article of claim 1, wherein the film layer further comprises a second polymer having a Tg of at least 25° C.

7. The multilayer article of claim 1, wherein the nonwoven material layer comprises a polylactic acid.

8. The multilayer article of claim 1, wherein the film layer is thermally bonded to the nonwoven material layer.

9. The multilayer article of claim 1, wherein at least one of the film layer and the nonwoven material layer comprises at least one of particles for surface matting, flame retardant materials, hydrolysis-inhibiting additives, and antimicrobials.

10. The multilayer article of claim 1, wherein the nonwoven material layer comprises an outer surface, and wherein the article further comprises a pressure sensitive adhesive layer bonded to the outer surface of the nonwoven material layer.

11. The multilayer article of claim 1, wherein the second surface of the film layer comprises at least one of a textured surface and a contoured surface, and wherein the nonwoven material layer comprises a top surface that is at least one of textured and contoured to mate with the textured second surface of the film layer.

12. The multilayer article of claim 11, wherein the nonwoven material further comprises at least one of a textured outer surface and a contoured outer surface opposite the top surface.

13. The multilayer article of claim 11, wherein the first surface of the film layer comprises a surface pattern that is different from at least one of:
   a surface pattern of the second surface of the film layer; and a surface pattern of the top surface of the nonwoven material layer.

14. The multilayer article of claim 1, wherein at least one of the film layer and the nonwoven material layer comprise multiple sublayers.

15. A method of making a multilayer article comprising the steps of:
bonding a film layer to a nonwoven material layer, wherein the film layer comprises a first surface and an opposite second surface, and wherein at least one of the film layer and the nonwoven material layer comprises a polylactic acid;
texturing a first surface of the film layer; and
imaging the film layer.

\* \* \* \* \*